March 25, 1924. 1,487,916
M. K. BROWN
CORN HARVESTER
Filed July 19, 1921   2 Sheets-Sheet 2
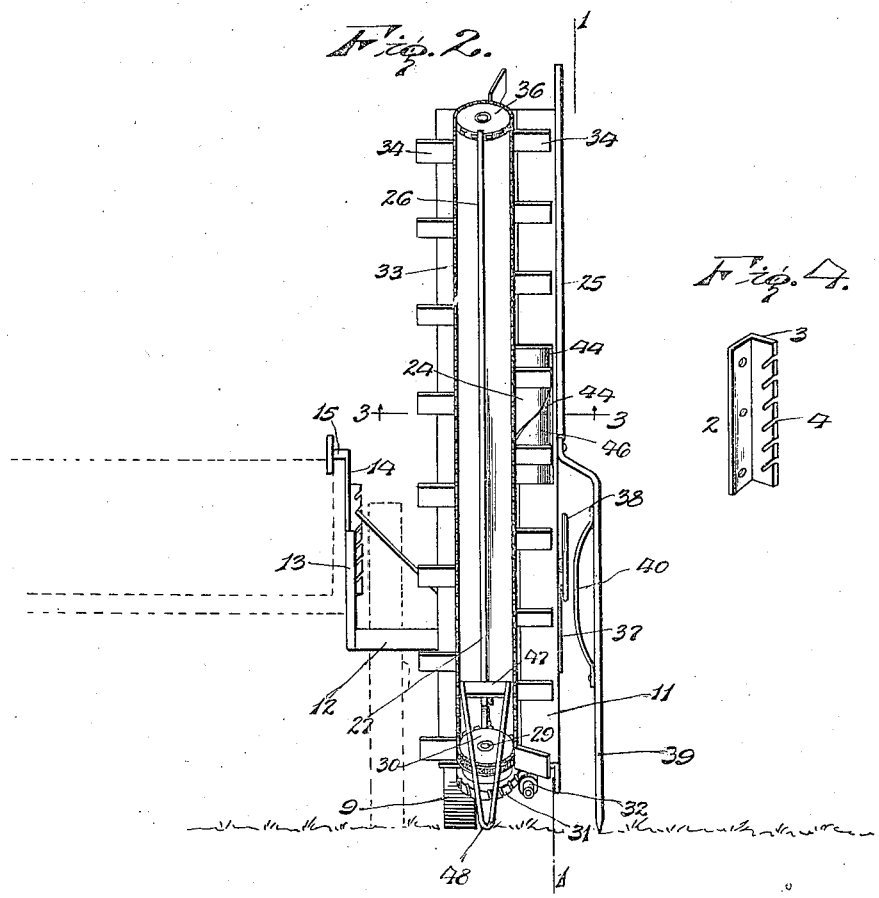
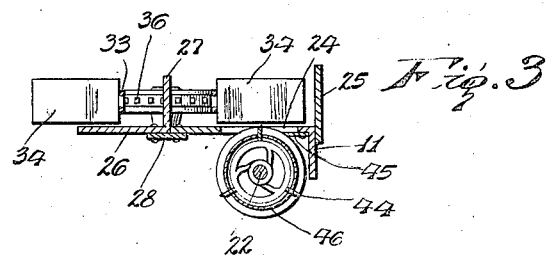
Inventor
M. K. Brown.
By Lacy & Lacy, Attorneys Patented Mar. 25, 1924.

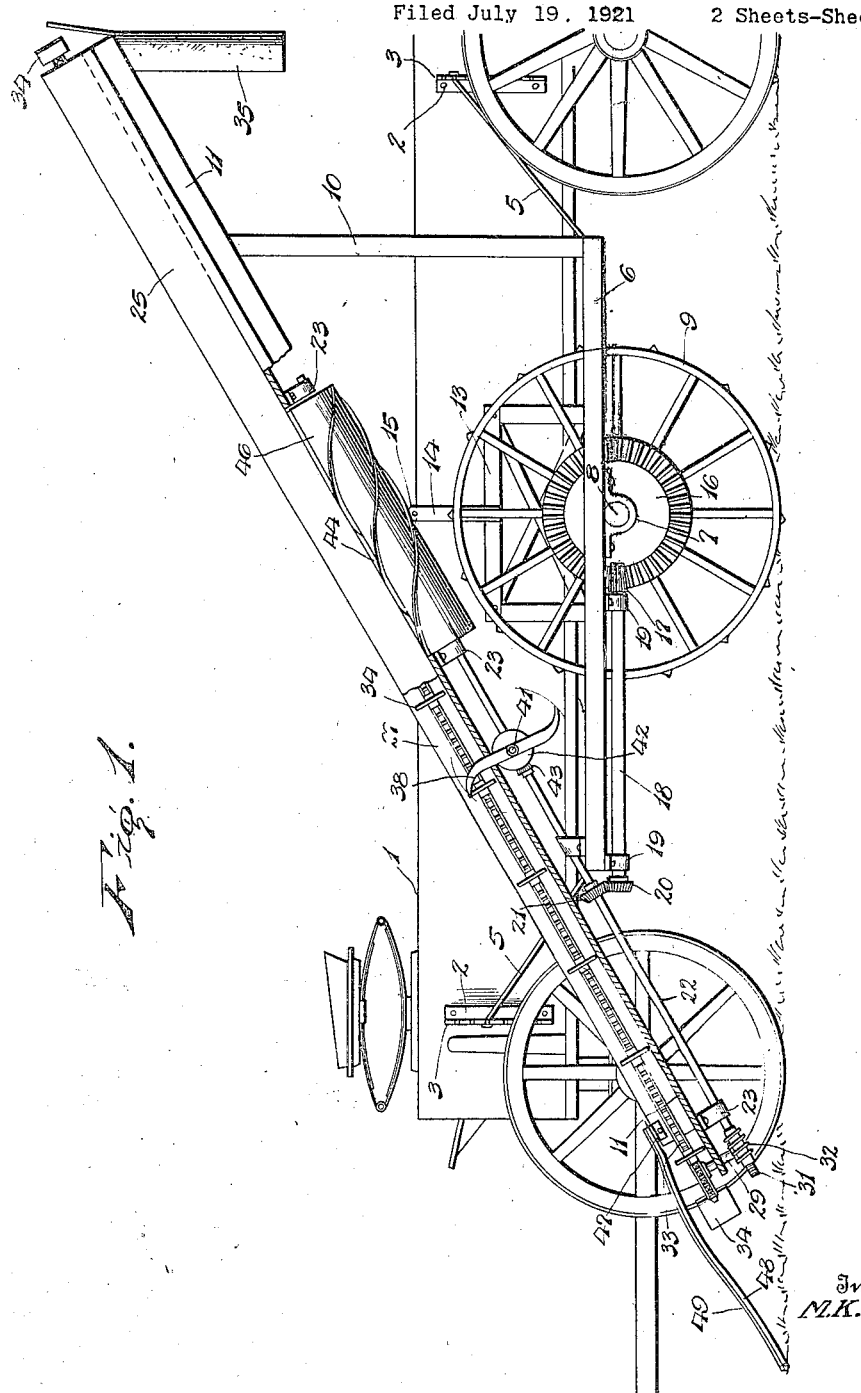

1,487,916

UNITED STATES PATENT OFFICE.

MILLARD K. BROWN, OF EAGLE GROVE, IOWA.

CORN HARVESTER.

Application filed July 19, 1921. Serial No. 485,932.

*To all whom it may concern:*

Be it known that I, MILLARD K. BROWN, a citizen of the United States, residing at Eagle Grove, in the county of Wright and State of Iowa, have invented certain new and useful Improvements in Corn Harvesters, of which the following is a specification.

This invention relates to corn harvesters and has for its object the provision of an apparatus which may be connected with a farm wagon to travel at the side of the same and in its progress pick up the corn, effectually sever the ears from the stalks, remove the husks from the ears, and then deliver the ears into the wagon. The invention seeks to provide an apparatus for the stated purpose which, while operating efficiently, will be of light draft and narrow gage and also free of complicated constructions and arrangements. The several stated objects and other objects which will incidentally appear in the course of the following description are attained in such mechanism as is illustrated in the accompanying drawings and the invention resides in certain novel features which will be particularly pointed out in the appended claims.

In the drawings—

Figure 1 is a view, partly in side elevation and partly in longitudinal section, of an apparatus embodying my invention and coupled to a wagon in operative position;

Fig. 2 is a front elevation of the same, the relative position of the wagon being indicated by dotted lines and the line 1—1 upon this figure indicating the vertical plane upon which the section in Fig. 1 is taken;

Fig. 3 is a detail transverse section on the line 3—3 of Fig. 2;

Fig. 4 is a perspective view of one of the anchor plates which are secured to the wagon body and utilized to retain the corn harvesting mechanism in proper relation to the wagon.

The wagon 1 may be of any known or preferred type and in itself forms no part of my invention. Anchoring plates 2, however, are secured to the side of the wagon body near the ends thereof and these anchoring plates consist of angle irons having one web disposed flat against the side of the wagon body and secured rigidly thereto, the remaining web 3 projecting laterally from the body and being provided with notches 4 in its edge which are engaged by hook links 5 extending from the front and rear ends respectively of the main frame 6 of the harvesting attachment.

The main frame 6 comprises spaced longitudinal bars or sills connected by short transverse bars and carrying bearings 7 in which an axle 8 is journaled. Upon the inner end of the axle a traction wheel 9 is mounted and fitted with any preferred form of escapement whereby, upon forward movement of the frame, motion will be imparted to the axle to rotate the same, but if the frame be caused to travel backwardly, the axle will remain at rest. At the rear end of the frame 6, I erect standards 10 which are secured at their upper ends to the inclined elevator frame 11 and serve to support the rear portion of said frame. As has been stated, the links 5 form connections between the front and rear ends of the frame 6 and the wagon body so that the said frame will be caused to travel with the wagon and will be held against dropping therefrom. To aid in holding the wheel frame 6 to the wagon body, I provide the lateral extension 12 which is secured rigidly to the inner side bar of the wheel frame and upon the said extension, I erect the vertical frame 13 which may be of any preferred form. From the said frame 13, a post 14 rises and this post is equipped at its upper end with a hook 15 adapted to engage over the upper edge of the wagon body and thereby prevent the wheel frame shifting laterally with respect thereto, as will be readily understood upon reference to Fig. 2.

Upon the axle 8 is secured a driving gear 16 which meshes with a beveled pinion 17 on the rear end of a longitudinal driving shaft 18 which is journaled in suitable bearing brackets 19 on the under side of the frame 6 and is equipped at its front end with a beveled gear 20. The beveled gear 20 meshes with a similar gear 21 secured upon the counter-shaft 22 which is journaled in suitable bearing brackets 23 on the under side of the elevator frame 11. The elevator frame comprises a plate having a depending outer flange, as shown most clearly in Fig. 3, and provided at a point intermediate its length with a slot or opening 24, a side wall 25 being secured to the said plate in the upper portion thereof and constituting a guard to prevent the corn dropping to the ground. The elevator frame further comprises an angle plate 26 having a longitudinal upstanding flange 27 which is disposed between the runs of the elevator chain and rests upon a base plate or bar 28 whereby a firm connection between the several plates of the elevator frame is effected and buckling of said frame is prevented. A shaft 29 is journaled in the lower end of the elevator frame and carries a sprocket 30 at its upper end and a worm gear 31 at its lower end, the worm gear meshing with a worm 32 on the lower end of the shaft 22 whereby rotation is imparted to the sprocket 30 and the elevator chain 33 which is trained around said sprocket is set in motion. The elevator chain 33 carries at intervals the blades 34 which are adapted to ride behind the ears of corn and carry them up the elevator frame and deliver them into a spout 35 through which they will pass into the wagon. The elevator chain passes around a sprocket 36 at the upper end of the elevator frame and the blades ride upon the bottom plate of the elevator frame so that the ears of corn will be supported by said plate and pushed over the same by the blades. Upon the side of the main plate 11 of the elevator frame, I secure a fixed knife 37 which cooperates with the rotating knife 38 whereby the ears of corn will be positively severed from the stalks, and a guard 39 is secured to the frame in rear of the knife 38 and extends forwardly and downwardly past the same so that the corn stalks will be guided to the cutters, and to insure the cutters acting upon all the ears a deflector 40 is secured to the inner side of said guard and projects laterally therefrom to a point close to the cutters whereby to press the corn stalks toward the cutters so that the ears may be severed from the stalks by the knife 38. This deflector may conveniently be a leaf spring so that it will effectually perform its allotted function without crushing or otherwise injuring the corn. It will also be readily understood that the guard 39 has its front terminal close to the surface of the ground so that it will ride under and pick up the stalks which may have fallen so that they will be brought into standing position and acted upon by the knives. The knife 38 is carried by a short shaft 41 which is journaled in the elevator frame and equipped with a beveled gear 42 meshing with a beveled pinion 43 on the transmission shaft 22.

The shaft 22 is obviously disposed longitudinally of the elevator frame and the upper end thereof is disposed at a point in rear of the rear end of the slot 24. Below the slot 24 spiral husking blades 44 are carried by the said shaft and cooperate with a fixed husking blade 45 on the elevator frame to grip the husks and strip the same from the ears as the corn is carried over the slot by the elevator. Between the blades 44, filler plates 46 are provided to support the ears of corn and prevent them dropping between the blades to the ground.

To the front end of the partition 27, I secure a bracket 47 and to the said bracket I secure a lifting finger consisting of a bar 48 doubled upon itself into V-form, as shown in Fig. 2, and extending forwardly and downwardly, as shown most clearly in Fig. 1. Fallen stalks will be raised by this finger and, to prevent them dropping onto the gearing and choking the same, the finger is covered with a plate 49, this plate being omitted from Fig. 2 in order that the gearing may be seen.

It is thought the operation will be readily understood from what has been said. The harvester is connected with a wagon so as to run close to the side of the same along a row of corn and, as it proceeds, motion will be imparted to the main shaft 18 from the driving gear 16 and thence transmitted through the gears 20 and 21 to the transmission shaft 22. The shaft 22 will directly actuate the elevator and the rotary knife 38 and as the husking blades 44 are secured to the shaft 22 they must rotate with it. The stalks are received between the side of the elevator frame and the guard 39 and are thereby directed to the knives 37 and 38 which cut the ears from the stalks and, inasmuch as the presser 40 holds the stalks toward the elevator, the severed ears will drop onto the elevator frame in position to be immediately engaged by the blades of the elevator. The guard 39 is spaced from the elevator frame just enough to admit the stalks and any ears which may present themselves to the guard will be pushed over to the elevator by the guard and the deflector 40, the deflector projecting close to the path of the rotating knife. Any ears which may be below the level of the cutter will be raised thereto by the combined action of the deflector, the guard 39 and the elevator, aided by the forward travel of the machine. Any ears which may be above the level of the cutter will be brought to the same by the slight bending of the stalk as it naturally yields to the impact of the advancing mechanism. The outer run of the elevator is traveling upwardly, as will be understood, and the blades thereon push the ears of corn upwardly and continuously so that they tend to drop through the slot 24, but this tendency to drop simply causes the husks to be engaged by the blades 44 and 45 and pinched between said blades so that they will be stripped from the cobs. The blades 34, of course, remain in contact with the ears of corn during the husking operation and move the same continuously upwardly so that they will clear the slot 24 and be conveyed to the upper end of the elevator and delivered into the spout 35 which discharges them into the wagon body.

It will be readily noted that I have provided a device of simple construction and compact arrangement which operates easily and directly to harvest the corn and deliver the stripped corn into the wagon body ready for storage in the bin. The apparatus may be readily connected with or disconnected from any farm wagon and will not interfere with the ordinary use of the wagon in any way. No change in the wagon is necessary when the harvester is to be used as the harvester is driven from power generated by its own traction wheel 9.

Having thus described the invention, what is claimed as new is:

1. A corn harvester comprising a main frame, a traction wheel mounted in said frame, means for attaching said frame to a wagon, an elevator frame supported on said main frame, means on the elevator frame for removing ears of corn from the stalks, means on the elevator frame above the ear-removing means for removing the husks from the ears, means for effecting travel of the ears upwardly over the elevator frame past said husking means and delivering the ears into a wagon, and means driven by said traction wheel for actuating the ear-removing means, the husking means, and the means for elevating the corn.

2. In a corn harvester, the combination of an inclined frame, a fixed straight husking knife secured longitudinally on said frame, spiral husking blades disposed longitudinally of the frame adjacent said fixed husking knife to cooperate therewith, means for rotating said spiral husking blades, and a conveyor traveling over the inclined frame to carry ears of corn over said husking blades.

3. In a corn harvester, the combination of an inclined frame plate, shafts journaled in and projecting above said plate at the ends of the same, means operatively connected with the lower shaft to rotate the same, sprockets on the upper ends of said shafts, an elevator chain trained around the said sprockets, blades carried by said chain to travel over the frame plate, a cutter mounted at the outer edge of said plate, means for rotating said cutter whereby to sever ears of corn from the stalks, the severed ears being engaged by the blades, means disposed below and projecting through the frame plate above the cutter to remove husks from the ears, and means for operating said husking means.

4. In a corn harvester, the combination of an inclined elevator frame, an elevator mounted on said frame, a fixed knife carried by the outer side of said frame, a vertically disposed knife mounted on the outer side of the frame to co-operate with the fixed knife and rotate about a horizontal axis, a guard connected to the elevator frame in rear of the knives and extending downwardly and forwardly in parallel spaced relation to the frame, and a deflector on the inner side of the guard adjacent the knives to press stalks to the knives.

MILLARD K. BROWN. [L. S.]